Jan. 21, 1930.   C. H. JENKINS   1,744,474
PROPELLER DRIVE MEANS
Filed Dec. 24, 1926   2 Sheets-Sheet 1
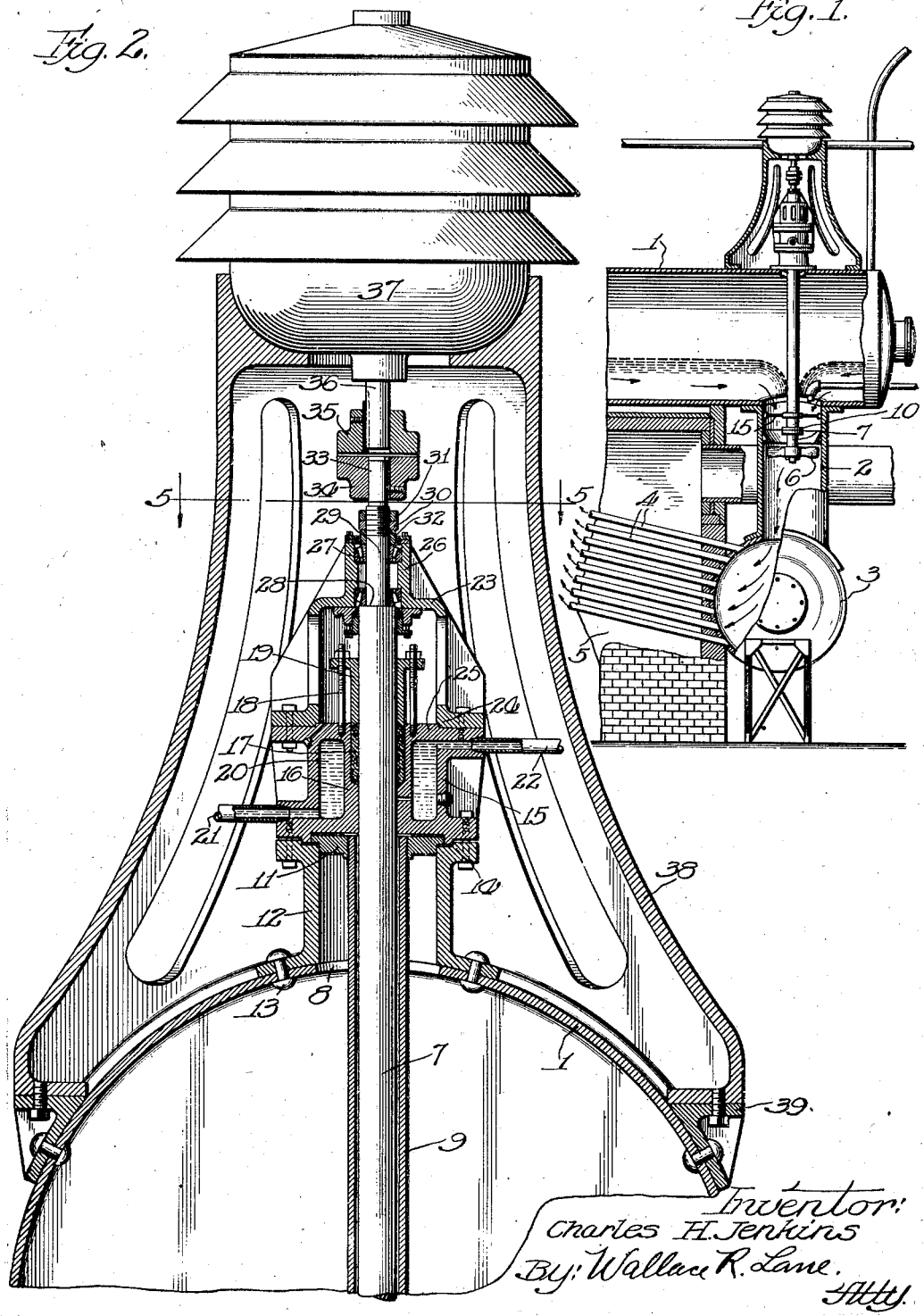
Inventor:
Charles H. Jenkins
By: Wallace R. Lane.
Atty.

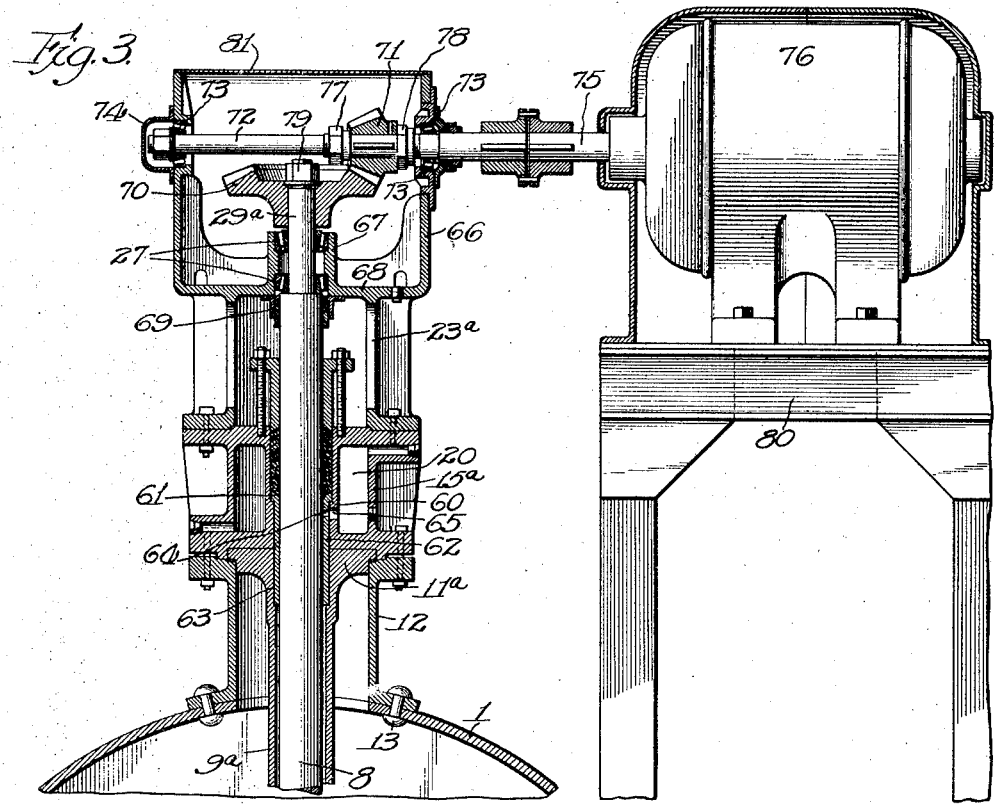
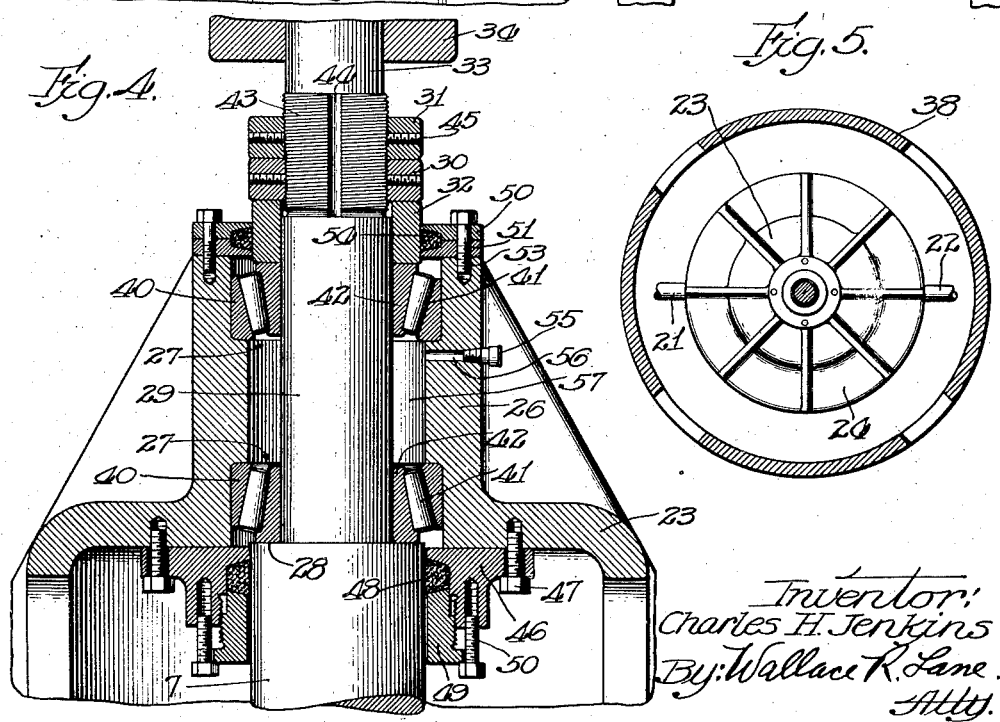

Patented Jan. 21, 1930

1,744,474

UNITED STATES PATENT OFFICE

CHARLES H. JENKINS, OF ST. LOUIS, MISSOURI, ASSIGNOR TO JENKINS PETROLEUM PROCESS CO., OF CHICAGO, ILLINOIS, A CORPORATION OF WISCONSIN

PROPELLER-DRIVE MEANS

Application filed December 24, 1926. Serial No. 156,842.

The present invention relates to power transmission devices, such as those used for operating a fluid propeller and the like.

Among the objects of the invention is to provide a novel driving means for fluid propellers and the like with means for preventing the jamming of the driving means with any foreign substances or matter. In drives for propellers in such devices as cracking stills and the like, it is usually difficult to prevent the hot oil, whether or not in caked condition, from reaching the relatively rotative parts of the driving means, such as the bearing for the shaft thereof, or the space between the shaft and the housing therefor, or other like and similar parts, and thus clogging the same. Moreover, bearing devices for such a shaft if heated above a given temperature may cause the shaft to wabble, whip or otherwise vibrate and not run smoothly and true. When used in a cracking still it has been difficult to prevent the heat from being transmitted to the bearings of the shaft. The present invention comprehends the provision of novel means to overcome and eliminate such disadvantages and difficulties by providing packing means for the shaft between the bearing means therefor and the shaft portion extending into the oil circulating passage of the still. It may also and preferably includes means for absorbing heat from the shaft and associated parts, such means in a specific illustrative embodiment comprising a cooling chamber around the shaft, or around the packing means therefor so that a cooling fluid, such as oil, water or the like may flow through such chamber and carry away the absorbed heat. To aid in this, the packing means preferably has metal packing and a metal sleeve associated with the shaft. In this way the heat that might be conducted by the shaft and associated parts, will be kept from reaching the bearing means for the shaft.

Another feature of the invention is the provision of novel means for rotatably supporting the shaft, such means being preferably in the form of a unitary set-up or rigid combination of associated parts, such parts having means for centering them and for holding the shaft in centered position. One of the parts may act as a closure means for the opening through which the shaft may extend into the circulating passage, another part acting as the bearing support for the shaft, and another part as the packing and cooling means or the support therefor.

Another feature of the invention is the provision of independent supports for the shaft and the means for operating it, such as a motor or the like. The unit above mentioned preferably forms such an independent support for the shaft. In this way whatever vibrations might be set up by the motor will not be transmitted to the shaft support and hence the shaft itself. Moreover, in order to prevent transmission of any vibrations to the shaft directly by the motor, the motor shaft or a shaft driven by it, and the propeller shaft are connected by a flexible coupling means adapted both to drive the propeller shaft without transmission of vibrations and whether or not the shafts be out of axial alinement. If the motor and propeller shaft were on a common support, the vibrations of the motor and connected parts would cause the propeller shaft to also vibrate and hence soon induce wear in the bearings and packings and the shaft would act with a wabbling, whipping or like action. This would soon permit leakage of the hot oil or hot vapors, as well as reduce the efficiency of the packing and cooling means whereby heat would easily reach the bearing with detrimental effects. Moreover, it would be impossible to prevent the shaft moving axially whether thrust means be used or not, the latter soon becoming worn and loose. The present invention therefore comprehends the elimination of such disadvantages by the provision of the novel means herein disclosed. It also includes the idea of using thrust bearings with means for properly and automatically lubricating the bearing.

Other objects, advantages, capabilities and features are comprehended by the invention as will later appear and as are inherently possessed thereby.

Referring to the drawings, Fig. 1 is a fragmentary view partly in section and partly in vertical elevation of a cracking still embodying the invention.

Fig. 2 is a view partly in section and partly in vertical elevation of one illustrative embodiment of the invention.

Fig. 3 is a similar view of another form.

Fig. 4 is a vertical sectional view taken through a part of the invention.

And, Fig. 5 is a horizontal sectional view taken in a plane represented by line 5—5 in Fig. 2 of the drawings.

Referring now more in detail to the drawings, the invention is shown as applied to an oil cracking still having a cracking drum 1 connected with a down leg or drum 2 leading to a cross drum 3 connected by a group of tubes 4 leading to the other end of the still and connected either directly or indirectly through another drum and leg to the drum 1, so as to provide a circuitous path or passage for the oil whereby the same may be rapidly circulated through the still when heat is being applied to the tubes 4 from the furnace 5.

For the purpose of causing the rapid circulation in the still of the oil, there is provided a propeller 6 attached to the end of a shaft 7 extending through an opening 8 in the upper part of the drum 1. Such shaft is housed in a housing 9 extending downwardly with bearing elements 10 near the propeller 6 and upwardly through the opening 8 where the upper end of the housing is rigidly secured to a flange 11 shouldered to rest upon and be centered by a supporting member 12. The latter is secured to the drum 1 in any suitable manner as by rivets 13 and has an upper shouldered portion 14 acting as a centering means both for the collar 11 and also for a second support 15. The lower end of the housing 9 may be held in centered relation by suitable connecting means 15 connected to the housing and to the side walls of the leg 2, such means being preferably adjustable to properly center the housing 9.

The shaft 7 extends upwardly through a packing means 16 forming an integral part of the second support or section 15, the packing means 16 having a box for receiving a metal packing 17, the upper part of the packing means 16 having connected stud screws 18 coacting with a gland 19 for acting upon the packing 17 as desired to tighten the same. The support 15 is also provided with a chamber surrounding the packing portion of the means, such chamber having an inlet connection 21 and an outlet connection 22 whereby a cooling fluid may be caused to flow through such connections and the chamber 20 for the absorbing of heat therefrom that might be transmitted from the shaft through the metallic packing and the packing means 16. In this way heat may arise from friction and particularly the heat that might be conducted through the shaft 7 as well as the sleeve 9, or the heat that might be transmitted by reason of hot oil creeping in the space between the shaft 9, may be absorbed at this locus and prevented from continuing above to the upper end of the shaft which is supported in bearings later described. The supporting member or section 15 may be secured to the section 12 in any suitable manner so that the two will form a single rigid unit.

Upon the supporting member or section 15 is a third supporting member 23 having a shoulder portion 24 for centering with a similar shoulder portion 25 on the member 15. The upper end of the member 23 carries a bearing shell 26 within which are located roller bearings 27 having inclined rollers whereby the shaft is not only rotatably supported therein but is also thrust as regards the axial movement of the shaft, the latter extending upwardly from the packing and cooling means and having a shoulder 28 against which one of the bearings may be in thrust abutment, and having a reduced portion 29 extending beyond the bearing means 26 and threaded to receive adjusting nuts 30 and 31 and also a thrust collar 32 acting against the other bearing with thrust abutment. The nut 31 may also act as a lock nut. The shaft continues above the threaded portion with a reduced diameter portion 33 carrying a flexible coupling member 34 provided with suitable means, such as tongues and grooves coacting with a similar coupling member 35 secured to the lower end of a shaft 36 of the motor 37. The latter is supported in any suitable manner upon an independent support 38 adapted to surround the mechanism above described and extending downwardly to be secured to any supporting means, such as brackets 39 fastened to the sides of the drum 1 in any suitable manner and as clearly shown in Fig. 2 of the drawings. It will be noted from the above that the three sections 12, 15 and 23 are rigidly secured together and properly centered to form a rigid single supporting unit or unitary supporting structure, this means constituting a support for the shaft 7 and associated parts. The motor 37, on the other hand, is supported upon an independent support 38 so that any vibrations which the motor 37 may set up in the support 38 will not be directly transmitted to the shaft 7 or the support therefor. By coupling the motor 37 with the shaft 7 through a flexible coupling, the latter is adapted both to drive the shaft when the shaft sections are out of axial alinement as well as to drive the same when the motor may be vibrating but without transmitting the vibrations to the shaft.

Referring more in detail to the bearing means shown in Fig. 4, each bearing 27 comprises a race 40 of annular form and fitting against shouldered portions of the shell 26 as clearly shown in Fig. 4. Upon these races race tapered rollers 41 which act against inner races 42 surrounding and engaging the shaft portion 29, the lower race 42 abutting the shoulder 28 and the upper race 42 abutting the abutment collar 32. Adjustment may be made by turning the adjustment nuts 30 and 31. The threaded portion 43 of the shaft portion 29 preferably has longitudinal grooves 44 in which may engage the ends of set screws 45 threaded through the nuts 30 and 31, as clearly shown in Fig. 4.

The bearing may also have suitable packing means for holding the lubricant in the shell 26, such packing means being shown as provided at both ends of the sh'l 26. At the lower end of the latter is provided one of these means comprising a plate 46 secured to a horizontal wall portion of the support 23 as by screws 47 and having a box in which is carried a packing 48, such as a metallic packing or the like, the packing being pressed in place by a gland 49 adapted to be adjusted by screws 50 threaded into the plate 46. At the other end a similar packing means is provided comprising a pair of plates 51 and 52 secured in place by screws 53 and having a packing groove for packing 54, which may be also of metal. Lubricating means 55 may be connected to a passage 56 to the chamber 57 of the shell 26 for supplying lubricant to such chamber.

In the embodiment shown in Fig. 3 the shaft 8 is similarly housed in a housing $9^a$ having at its upper end a flanged portion $11^a$ shouldered for centering upon a shouldered upper portion of the support 12 secured to the drum 1 by rivets 13 as in the previously described form. Upon the supporting section 12 is a supporting section $15^a$ similar to section 15 of the other construction, this supporting member, however, being provided with a shouldered portion 60 for supporting a flange 61 of a sleeve or bushing 62 surrounding the shaft and fitting in the lower part of the member $15^a$ and also in a socketed part 63 in the upper end of the shaft housing $9^a$. The sleeve 62 may also be provided with an aperture 64 for the feeding of oil from the chamber 20 of the member $15^a$, the latter being also provided with an opening 65 so that the cooling oil may have access to the shaft and sleeve. In other respects the device $15^a$ is constructed the same as the member 15 in the form shown in Fig. 2 of the drawings.

Upon the member $15^a$ is a third supporting portion or section $23^a$ formed at its upper end with a chamber 66 within which is enclosed gearing mechanism and lubricant. The upper end of the shaft 8 extends through an opening in the bottom of this chamber 66 and a bearing carried by a bearing shell 67 formed integrally with the bottom 68 of this chamber. Taper roller bearings 27 are associated with this shell and with a reduced portion 29 of the shaft. The packing means 69 may also be used below the chamber 66 and around the shaft to prevent the leakage of lubricant therefrom. To the shaft portion 29 is keyed a beveled gear 70 operating with a bevel pinion 71 keyed to a horizontal shaft 72 rotatably supported in taper or thrust bearings 73 and 74 mounted in the opposite side walls of the casing or housing 66. At one end the shaft 72 may be covered by a cap 74 secured to the side wall of the housing 66. At the other end the shaft 72 extends to a flexible coupling means of any suitable type also connected to an end of a shaft 75 of a motor 76. The pinion 71 may be adjusted along the shaft 72 for proper meshing with the gear 70 by means of adjusting nuts 77 and 78 which may be turned to effect the desired adjustment. The upper end of the shaft portion $29^a$ has a thrust nut 79 for holding the gear 70 in position and adjusting the same so that the hub of the gear 70 may act as a thrust member or abutment means against the upper bearing 27 of the bearing means.

The motor 76 is supported upon any suitable, separate and independent supporting means 80 which may be supported upon the ground or any part of the still, but free of the supporting means for the shaft 8. The members 12, $15^a$ and $23^a$ constitute a single rigid and unitary supporting means for the shaft independently of the support for the motor. Any vibration set up by the motor 76 will not be transmitted to this support for the shaft or the shaft itself through any connection to the supports, and whatever vibrations are set up in the motor will not be transmitted to the shaft by reason of the use of a flexible coupling between the motor shaft 75 and the driving shaft 72 geared to the propeller shaft 8.

The interior of the chamber 66 is filled with suitable lubricant and the top may be closed by a plate 81. The lubricant in the chamber 66 will automatically and properly lubricate the gears, and also will work into the bearings 27 to maintain the same lubricated. The packing 69 will prevent the same from leaking from the bearing.

Bearing elements usually are not able to stand much heat and any temperatures such as 250° or the like effecting any bearings usually will cause the same to operate inefficiently or detrimentally. By interposing a heat absorbing means between the bearing and the source of the heat, a roller bearing may be used in this type of construction without any danger of the bearing becoming overheated. Also by supporting the bearing and heat absorbing means as well as the means for closing the opening around the shaft and in the drum 1, by a single rigid unitary structure to act as a support for the shaft, and by making the support independent of the support for the motor for driving the shaft, elimination of all vibrations that might be set up by the motor is effected in so far as the shaft is concerned. In this way a whipping or wabbling action of the shaft will not be effected and hence the wearing of the bearings, packings and the shaft itself will be avoided. This will result in reducing or wholly eliminating replacements of the shaft and the housing therefor and other parts associated therewith as has heretofore been required. Also by this construction it is possible to use thrust bearings or the taper type of roller bearings which have been impossible heretofore. This does away with the provision of tapered collars or the like upon the shaft for preventing the escape of hot oil or hot vapors. The packing for the shaft is preferably of metal and cooperating with the sleeve of the shaft to provide a very efficient means for preventing any leakage of fluid along the surface of the shaft as well as acting in aid of transmitting conducted heat to the cooling portion of the device whereby the heat may be readily absorbed and prevented from reaching the bearing. Moreover, the driving means from the motor to the shaft, including the gears, is contained in a self-contained lubricating holding chamber which also acts as a housing for the gears, the lubricant acting to lubricate the gears as well as the bearings, since the latter is directly connected in the chamber.

Having thus described and upon the drawings shown two embodiments of the invention, it is to be understood that the latter is not limited thereto but may comprehend other constructions, arrangements of parts, details and features without departing from the spirit thereof.

Having thus disclosed the invention, I claim:

1. In an oil cracking still having a circuitous passage for the circulation of the oil undergoing cracking, means for causing a circulation of the oil in said passage and comprising a driving member extending into the circulating passage, a housing for said driving member, means for supporting the housing, means for packing the driving member and the housing to prevent passage of oil therebetween, and self-alining bearing means for the driving member beyond said packing means and outside said still.

2. In an oil cracking still having a circuitous passage for the circulation of the oil undergoing cracking, means for causing a circulation of the oil in said passage and comprising a driving member extending into the circulating passage and to the exterior of the still, a housing for said driving member, means for supporting the housing, means for packing the driving member and the housing to prevent passage of oil therebetween, self-alining bearing means beyond the packing means and for the exteriorly extending portion of the shaft, and means for cooling said packing means for absorbing heat conducted by said driving member and said housing.

3. In an oil cracking still having a circuitous passage for the circulation of the oil undergoing cracking, means for causing a circulation of the oil in said passage and comprising a driving shaft, a self-alining bearing for said shaft, and packing means between said bearing and said passage to prevent escape of oil from said passage.

4. In an oil cracking still having a circuitous passage for the circulation of the oil undergoing cracking, means for causing a circulation of the oil in said passage and comprising a driving shaft, a self-alining bearing for said shaft, packing means between said bearing and said passage to prevent escape of oil from said passage, and cooling means associated with said shaft and said packing means and located between said bearing and said passage to absorb heat conducted by said shaft and to prevent the conduction of heat to said bearing.

5. In an oil cracking still having a circuitous passage for the circulation of the oil undergoing cracking, means for causing a circulation of the oil in said passage and comprising a driving shaft extending into said passage and through an opening provided in said passage, means for closing said opening, packing means for said shaft and carried by said closing means, and self-alining bearing means for the shaft outside of said still where the same is unaffected by the heat of the still.

6. In an oil cracking still having a circuitous passage for the circulation of the oil undergoing cracking, means for causing a circulation of the oil in said passage and comprising a driving shaft extending into said passage and through an opening provided in said passage, means for closing said opening, a housing for the shaft and supported at an end thereof by said closing means, means for preventing escape of oil from said housing, and self-aligning bearing means for the shaft outside of said still where the same is unaffected by the heat of the still.

7. In an oil cracking still having a circuitous passage for the circulation of the oil undergoing cracking, means for causing a circulation of the oil in said passage and comprising a driving shaft extending into said passage and through an opening provided in said passage, means for closing said opening, packing means for said shaft and carried by said closing means, and bearing means exteriorly of said still and for an exteriorly extending portion of said shaft, said packing means preventing escape of oil from said passage.

8. In an oil cracking still having a circuitous passage for the circulation of the oil undergoing cracking, means for causing a circulation of the oil in said passage and comprising a driving shaft extending into said passage and through an opening provided in said passage, means for closing said opening, packing means for said shaft and carried by said closing means, bearing means for said shaft located exteriorly of said still and said packing means, said packing means preventing escape of oil from said passage, and cooling means associated with said shaft in the locus of said packing means for absorbing heat and preventing transmission of heat to said bearing means.

9. In an oil cracking still having a circuitous passage for the circulation of the oil undergoing cracking, means for causing a circulation of the oil in said passage and comprising a driving shaft extending into said passage and through an opening provided in said passage, means for closing said opening, said shaft extending beyond said closing means, bearing means supported on said closing means and associated with the extended portion of said shaft, means for centering said bearing means with reference to said closing means, and packing means associated with said shaft and said bearing means.

10. In an oil cracking still having a circuitous passage for the circulation of the oil undergoing cracking, means for causing a circulation of the oil in said passage and comprising a driving shaft extending into said passage and through an opening provided in said passage, means for closing said opening, said shaft extending beyond said closing means, a tubular housing for said shaft and being supported by said closing means, means for centering said housing on said supporting means, packing means for said extended portion of said shaft and carried by said closing means, and bearing means for said extended portion of said shaft and disposed beyond said packing means.

11. In an oil cracking still having a circuitous passage for the circulation of the oil undergoing cracking, means for causing a circulation of the oil in said passage and comprising a driving shaft, a rigid unitary device for rotatably holding said shaft for operating said means, said device comprising a bearing carrying section exteriorly of said still, and a closure section for closing an opening in said passage and through which said shaft extends into said passage.

12. In an oil cracking still having a circuitous passage for the circulation of the oil undergoing cracking, means for causing a circulation of the oil in said passage and comprising a driving shaft, a rigid unitary device exteriorly of said still for rotatably holding said shaft for operating said means, said device comprising a bearing carrying section, and a housing for enclosing power transmitting means to said shaft and for containing a lubricant therefor and for said bearing means.

13. In an oil cracking still having a circuitous passage for the circulation of the oil undergoing cracking, means for causing a circulation of the oil in said passage and comprising a driving shaft, a rigid unitary device exteriorly of said still for rotatably holding said shaft for operating said means, said device comprising a bearing carrying section, and taper bearing means in the latter section and associated with said shaft to prevent lateral and axial movement of said shaft while said shaft is rotated.

14. In an oil cracking still having a circuitous passage for the circulation of the oil undergoing cracking, means for causing a circulation of the oil in said passage and comprising a driving shaft, a rigid unitary device for rotatably holding said shaft for operating said means, said device comprising a bearing carrying section exteriorly of the still, and bearing means in said section for said shaft, said shaft having shouldered portions cooperating with said bearing means whereby the latter prevents axial and lateral movement of said shaft when rotating.

15. In an oil cracking still having a circuitous passage for the circulation of the oil undergoing cracking, means for causing a circulation of the oil in said passage and comprising a driving shaft, a rigid unitary device for rotatably holding said shaft for operating said means, said device comprising a bearing carrying section, self-alining bearing means in the said section and associated with said shaft to prevent lateral and axial movement of said shaft while said shaft is rotated, and means for adjusting the relation of said bearing means and said shaft.

16. In an oil cracking still having a circuitous passage for the circulation of the oil undergoing cracking, means for causing a circulation of the oil in said passage and comprising a driving shaft, a rigid unitary device for rotatably holding said shaft for operating said means, said device comprising a bearing carrying section exteriorly of the still, bearing means in the latter section and associated with said shaft to prevent lateral and axial movement of said shaft while said shaft is rotated, motor means for driving said shaft, and a separate support for said motor means.

17. In an oil cracking still having a circuitous passage for the circulation of the oil undergoing cracking, means for causing a circulation of the oil in said passage and comprising a driving shaft, a rigid unitary device for rotatably holding said shaft for operating said means, said device comprising a bearing carrying section, bearing means in the latter section and associated with said shaft to prevent lateral and axial movement of said shaft, while said shaft is rotated, motor means for driving said shaft, and a flexible connection between said motor means and said shaft to prevent transmission of vibrations to said shaft.

18. In an oil cracking still having a circuitous passage for the circulation of the oil undergoing cracking, means for causing a circulation of the oil in said passage and comprising a driving shaft, a rigid unitary device for rotatably holding said shaft for operating said means, said device comprising a bearing carrying section, bearing means in the latter section and associated with said shaft to prevent lateral and axial movement of said shaft while said shaft is rotated, motor means for driving said shaft, a separate support for said motor means, and a flexible connection between said motor means and said shaft to prevent transmission of vibrations to said shaft.

19. In a power transmitting device adapted to operate a propelling device for fluids, a power source, means for supporting the same, a driving member operated by said power source, means for independently and rotatably supporting said driving member, flexible means between said power source and said driving member to prevent transmission of vibrations from said power source to said driving member and the supporting means therefor, and self-alining bearing means for said shaft and carried by said latter supporting means.

20. In a power transmitting device adapted to operate a propelling device for fluids, a power source, means for supporting the same, a driving member operated by said power source, means for independently and rotatably supporting said driving member, flexible means between said power source and said driving member to prevent transmission of vibrations from said power source to said driving member and the supporting means therefor, self-alining bearing means for said shaft and carried by said latter supporting means, and heat absorbing and packing means associated with said shaft and bearing means for preventing transmission of heat and fluid to said bearing means.

In witness whereof, I hereunto subscribe my name to this specification.

CHARLES H. JENKINS.